US006728601B2

United States Patent
Garcia et al.

(10) Patent No.: US 6,728,601 B2
(45) Date of Patent: Apr. 27, 2004

(54) MULTIPLE HOST POWER CONTROL SYSTEM AND METHOD

(75) Inventors: Enrique Garcia, Tucson, AZ (US); Yvonne Hanson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 09/908,944

(22) Filed: Jul. 19, 2001

(65) Prior Publication Data

US 2003/0018921 A1 Jan. 23, 2003

(51) Int. Cl.$^7$ .............................................. G05D 11/00
(52) U.S. Cl. .......................... 700/286; 713/340; 307/18
(58) Field of Search ................................ 700/286, 293, 700/292, 295; 713/340; 709/201; 307/18, 43, 85

(56) References Cited

U.S. PATENT DOCUMENTS

| | | | |
|---|---|---|---|
| 4,479,228 A | 10/1984 | Crane | 375/7 |
| 5,679,985 A * | 10/1997 | Brailey et al. | 307/18 |
| 5,734,373 A * | 3/1998 | Rosenberg et al. | 345/161 |
| 6,018,204 A * | 1/2000 | Kuruma | 307/64 |
| 6,047,222 A | 4/2000 | Burns et al. | 700/79 |
| 6,081,752 A | 6/2000 | Benson, IV et al. | 700/79 |
| 6,383,076 B1 * | 5/2002 | Tiedeken | 463/40 |
| 6,389,546 B1 * | 5/2002 | Kano et al. | 713/340 |
| 6,476,521 B1 * | 11/2002 | Lof et al. | 307/105 |
| 6,493,243 B1 * | 12/2002 | Real | 363/17 |
| 6,496,342 B1 * | 12/2002 | Horvath et al. | 361/65 |
| 6,522,955 B1 * | 2/2003 | Colborn | 700/286 |
| 6,653,821 B2 * | 11/2003 | Kern et al. | 322/7 |
| 2002/0198627 A1 * | 12/2002 | Nasman et al. | 700/286 |

\* cited by examiner

*Primary Examiner*—Leo Picard
*Assistant Examiner*—Zoila Cabrera
(74) *Attorney, Agent, or Firm*—Hayes, Soloway, Hennessey; Allen K. Bates

(57) ABSTRACT

A system and method is provided for multiple hosts to control one or more power systems redundantly, by constructing a power supply system having a plurality of physically separate and redundant communication interfaces, one coupled to each host, wherein a software algorithm determines whether the power supply system should be on or off at a given point in time, based on signals received from the hosts. In an exemplary embodiment, a power control system consistent with the invention comprises at least two hosts, each host comprising a host communications interface; and a power supply system comprising a power supply, control software, and a plurality of power supply system communications interfaces. Each power supply system communications interface corresponds to, and is in communication with, one host communications interface on each host; and the control software is adapted to turn on the power supply when at least one power supply system communications interface receives a "turn on" signal from the corresponding host communications interface. In method form, a method for controlling power in a power control system having at least two hosts and a power supply system comprising a power supply comprises: determining whether at least one host requires the power supply system to be on; and turning on the power supply based on that determination.

9 Claims, 8 Drawing Sheets

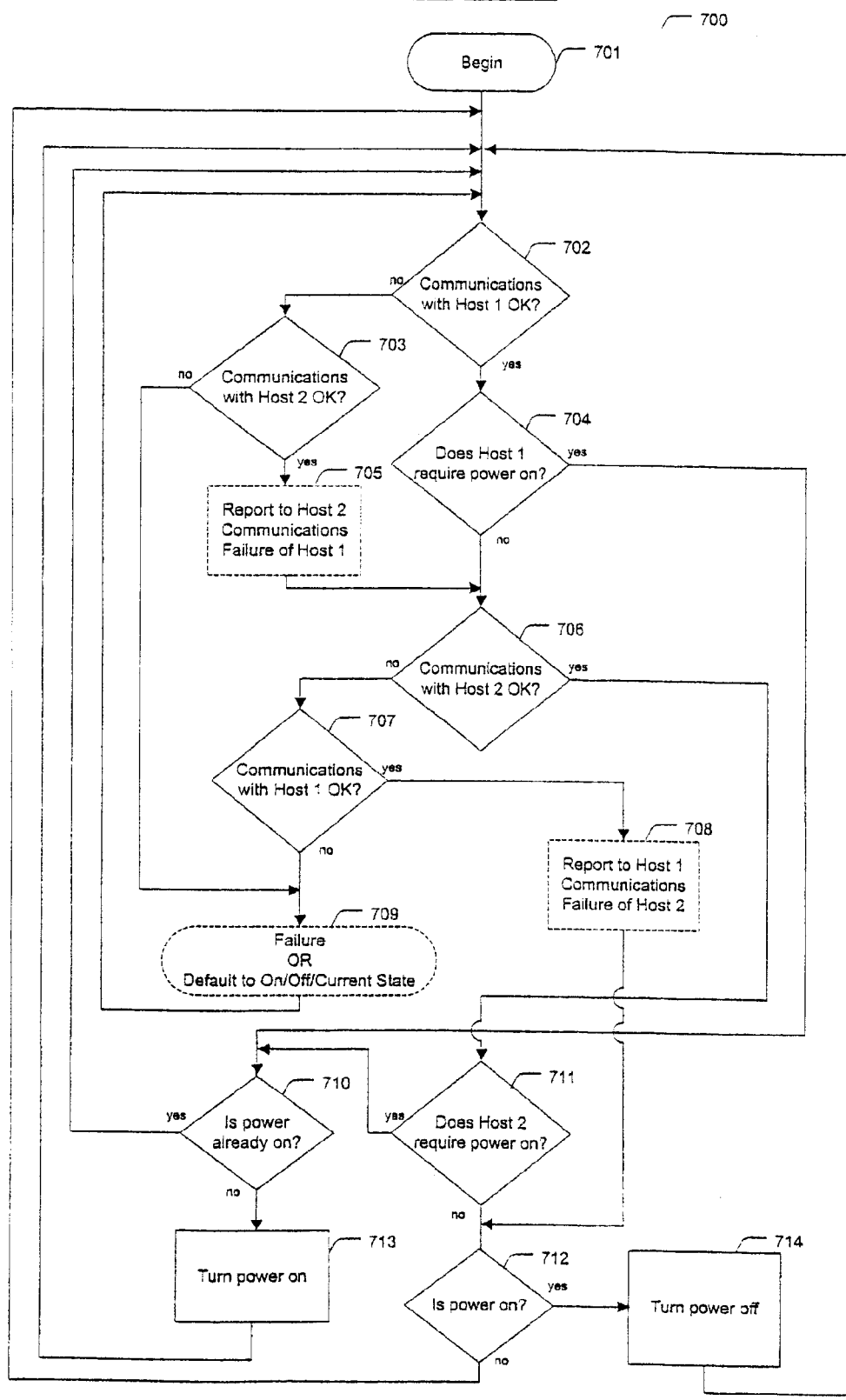

MULTIPLE HOST POWER CONTROL SYSTEM AND METHOD

BACKGROUND OF THE INVENTION

The present invention relates generally to power supply systems, and more particularly, to a system and method for multiple hosts to redundantly control one or more power systems.

Power supply systems employing remote host control are utilized in a variety of settings. The concept of remote power control (and often reboot) is indicated where convenience of power control and minimizing downtime is important, e.g., for wide-area networked (WAN) environments and other communications applications.

When a piece of local-area networked (LAN), WAN, telecommunications, or other control equipment has "locked-up" and is no longer responding to normal methods of communication, it is often necessary to perform a cold boot of the equipment. After the power has been cycled on and off, normal communications with the problem equipment via network can resume.

Such problems may occur, e.g., where WAN environments (e.g., Internet points-of-presence (POPs), or private networks) are centrally controlled, yet servers, routers, and dial-up equipment frequently lock-up and require a reboot. Other scenarios may involve, e.g., satellite control equipment at communication towers, cellular towers or radio equipment. Remote power control may also be appropriate in other AC powered devices, e.g., air conditioners and heaters which may be turned on or off at un-manned stations for climate control. Further applications for remote power control include, e.g., out-of-band management, general data switching applications, and remote site management, such as terminal server and router rebooting and power control, "communications closet" power management, enterprise-wide power management, timed power management, and uninterrupted power supply (UPS) management.

Accessing equipment remotely to control power supplies may be difficult, if either the site in question is either an un-manned site, or the problem occurs after normal business hours. Even if power control is necessary while personnel are on-site, relying on personnel on-site requires that they be savvy enough not to cycle power to, and not to reboot, the wrong device.

Permitting a system administrator to perform power cycle or remote reboot functions is one means of avoiding potential communication failures. A basic solution known in the art involves employing a remote power control switch that may be controlled by a system administrator to ensure correct booting sequences in the event of system failures. Instead of simply using a switch for remote power control, more elaborate power management capability may be provided remotely, e.g., using a communication interface through which a host can effect power control and monitor power status, including such status items as open/closed state of circuit breakers, bus voltages, and power flow of transmission lines and their frequency. Such a control scheme may involve controlling power remotely via serial commands (e.g., RS-232C or RS-485), thus allowing for power control by means of standard external asynchronous modems, over a network (e.g., via TCP/IP) by using a terminal server or communications server, or locally by using terminal software. ASCII commands sent to a remote power supply system may either query status items of, or control, the power supply system. If the power is controlled using standard commands (e.g., ASCII) and standard modems or network interface devices, only terminal emulation or other appropriate interface software is required to dial up the site (or access the site via network) to control power. Also, such real-time communication with the power supply may provide responses from the power supply after each command has been accomplished. Of course, relying on a human system administrator to control remote power from a remote terminal is not necessarily failsafe, due to human error.

Thus, power control is often achieved using autonomous and semi-autonomous hosts (i.e., hosts requiring only some human interaction) that monitor power supply systems and control them, based on status data received. A monitoring and control host is typically coupled via a network to a communication interface at or on the power supply system. In a typical high-end power system, a communication interface is provided, through which a host can effect power control and monitor power status. In order to allow multiple hosts to access a single power system, the hosts must contend for the communication interface. Traditional arbitration and switching techniques can be applied to resolve this contention but have inherent drawbacks. One such drawback is that only one host can access the power supply at a time. Thus, a method for arbitrating and switching a "winner" on to the communication channel must be implemented. Further, there is no way of preventing a broken host from locking up the communication channel, thereby preventing access to the power system by another host. Finally, there is no redundancy in such a configuration, i.e., no way to protect the power supply from a single "deranged" host falsely issuing a power-off control sequence.

One known implementation comprises a single master host directly connected to the power system, with multiple non-master hosts connected to the master host. The non-master hosts then communicate with the master host to receive access to the power system. In this implementation, the non-master hosts can simply provide controls and commands for the power system to the master host, allowing the master host to resolve any conflicts. This allows the non-master hosts to move on to other tasks. However, if an error occurs within the master host, or on the communication link between the master host and the power supply, the power system would be inaccessible to all of the non-master hosts.

SUMMARY OF THE INVENTION

The present invention provides a system and method for multiple hosts to control one or more power systems redundantly. This is accomplished by constructing a power supply system having a plurality of communication interfaces that are physically separate and redundant and that are the same in number as the number of hosts in the system. The communication interfaces are coupled to a software algorithm receiving commands from the hosts via the communication interfaces, to determine whether the power supply system should be on or off at a given point in time. This architecture eliminates the need for arbitration and prevents any single point of failure associated with a host or its communication channel from affecting communication with the other host. The goals of the system and method are to provide physical and logical redundancy, i.e., never to turn off the power system falsely, and to provide power control even when a host or its communication channel has failed.

Such a system allows either host to turn on the power system. However, both hosts agree to turn the power system off, or alternatively, one host may turn off the system only when the other host is not operational. Thus, fully redundant and fault tolerant power system control may be provided.

In an exemplary embodiment, a power control system consistent with the invention comprises at least two hosts, each host comprising a host communications interface; and a power supply system comprising a power supply, control software, and a plurality of power supply system communications interfaces. Each power supply system communications interface corresponds to, and is in communication with, one host communications interface on each host; and the control software is adapted to turn on the power supply when at least one power supply system communications interface receives a "turn on" signal from the corresponding host communications interface.

In an exemplary method consistent with the invention, a method for controlling power, in a power control system having at least two hosts and a power supply system comprising a power supply, comprises: determining whether at least one host requires the power supply system to be on; and turning on the power supply based on that determination.

BRIEF DESCRIPTION OF THE DRAWINGS

FIG. 8 is a flowchart illustrating a further exemplary power supply system algorithm in a multiple host power control system consistent with one embodiment of the invention.

DETAILED DESCRIPTION OF EXEMPLARY EMBODIMENTS

Configuration with Two Hosts and One Power Supply System

Figure 1:
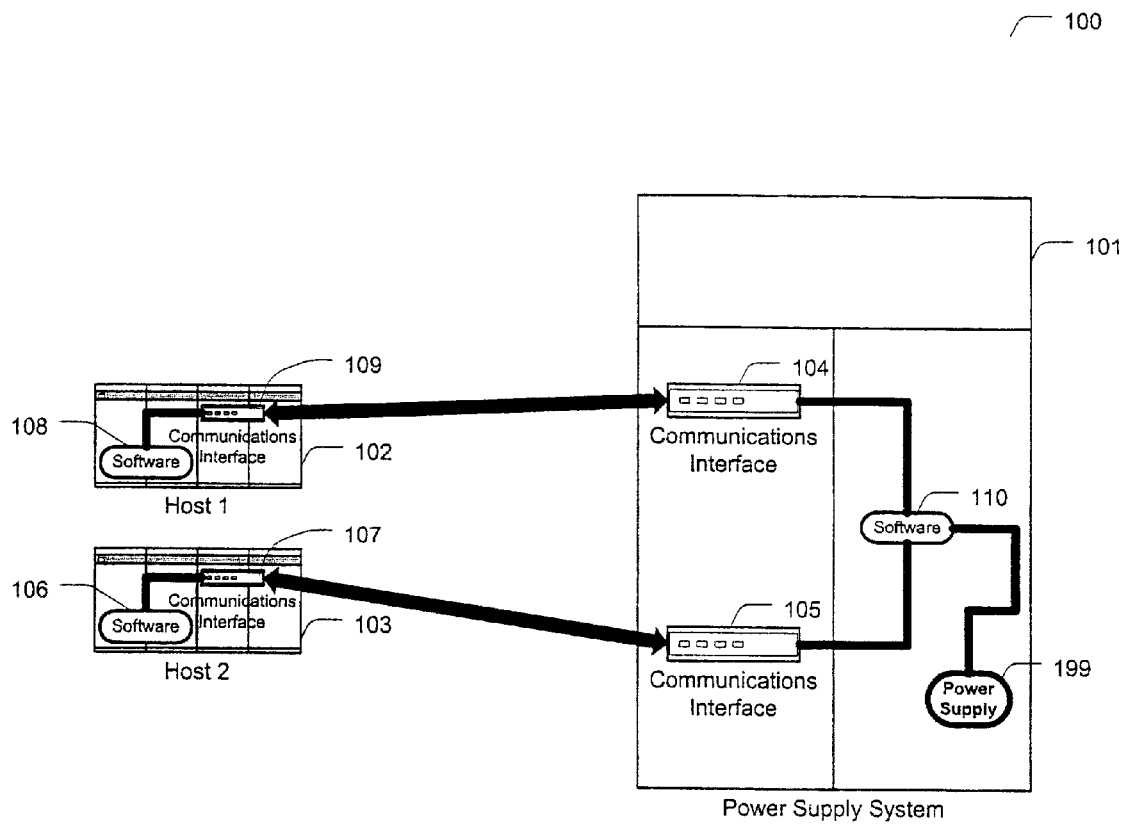
FIG. 1 is a system diagram illustrating an exemplary multiple host power control system, consistent with one embodiment of the invention, comprising two hosts and one power supply system.

With reference now to FIG. 1, a system diagram illustrates an exemplary multiple host power control system 100, consistent with one embodiment of the invention, comprising two hosts 102, 103 and one power supply system 101. Each host 102, 103 is equipped with a communications interface 109, 107 and appropriate software 108, 106 for interfacing with the power supply system 101. The power supply system 101 comprises a power supply 199, two communications interfaces 104, 105, one for each host 102, 103, and appropriate software 110 for interfacing with the hosts 102, 103. The communications interfaces 104, 105 are physically separate and redundant, and one communications interface 104, 105 is provided for each host 102, 103 in the system. The communication interfaces 104, 105 of the power supply system 101 are coupled to a software algorithm 110 (described in further detail hereinbelow, under Power Supply System Algorithms, with reference to FIGS. 5–8) for determining whether the power supply system 101 should be on or off at a given point in time, based on signals received from the hosts 102, 103, and for turning the power supply 199 on or off, accordingly. Those skilled in the art will recognize that, although the software 110 of the power supply system 101 is illustrated in FIG. 1 as being a single piece of code in communication with both communications interfaces 104, 105, alternatively, the software 110 could reside outside the power supply system 101, or each communications interface 104, 105 of the power supply system 101 could contain its own software (not shown) for interfacing with each other and with the hosts 102, 103. Likewise, appropriate communications interfaces 109, 107 and software 106, 108 reside on each host 102, 103 for interfacing with the power supply system 101. Of course, the software 106, 108 could alternatively reside outside the hosts 102, 103 or could be internal to the communications interfaces 109, 107 of the hosts 102, 103.

In this configuration, if only one of the hosts 102, 103 or both hosts 102, 103 require power to be on, the software 110 (described in further detail hereinbelow, under Power Supply System Algorithms, with reference to FIGS. 5–8) will ensure the power is turned on. If neither host 102, 103 requires power to be on, the software 110 will ensure the power is off. If either host 102, 103 freezes, loses communication with the power supply system 101, or otherwise fails, the other host 102, 103 is still available as a failsafe to control power to the power supply system 101. Thus, even if the malfunction of the failed host 102, 103 ties up the communications interface 104, 105 through which it is connected to the power supply 101, the other host 102, 103 may still serve as a backup by accessing the other available communications interface 104, 105 to control the power supply system 101.

It is contemplated that the power supply system 101 could be any system comprising a device for supplying power, such as a DC/DC converter for stepping a high voltage (e.g., 390V) down to logic voltage (e.g., 3–12V). The power supply system 101 could also comprise elements other than a power supply itself, and the present invention therefore has utility outside the context of devices that solely provide power. For example, an automobile airbag control system might comprise a plurality of hosts controlling the deployment of the airbag and a power supply for the deployment mechanism. In this case, the power supply system 101 would comprise the device providing power to the airbag deployment mechanism, and the plurality of hosts would serve to provide redundancy, to place additional checks on whether the airbag should deploy or not, thereby preventing accidental deployment and/or ensuring deployment when necessary. Other specific examples of systems or devices for which the present invention may have utility include, e.g., direct-access storage device (DASD) storage subsystems, redundant arrays of inexpensive disks (RAID), servers, microcomputers, minicomputers, printers and other output devices, and mainframes.

The hosts 102, 103 could be any local or remote power control device, e.g., a power control card, and may comprise a microcontroller, memory, and/or programmable logic, as required.

The communications interfaces 104, 105 of the power supply system 101 and the communications interfaces 107, 109 of the respective hosts 102, 103 could employ any protocol and/or interface that provides a positive communication to detect presence of, and/or commands from, the host 102, 103. Such protocols and interfaces may include, e.g., RS-232, RS-422, RS-485, IEEE 488, I2C, M-Bus, SPI, ADB, USB, Microwire, IrDA Dallas 1-wire, synchronous, asynchronous, or other serial protocol, parallel protocol. The communications interfaces 104, 105, 107, 109 may be connected to one another via a wired, wireless (e.g., infrared, other optical, or radio frequency), direct (e.g., RS-232) or indirect (e.g., TCP/IP, NetBEUI) connection, either bi-directional or unidirectional (see discussion of "heartbeat" and "ping", hereinbelow, under Power Supply System Algorithms), with either a continuous link or a link requiring login and/or authentication. Depending on the requirements of the power supply system, the communications interfaces 104, 105, 107, 109 could, e.g., be networked together by conventional network hardware and software (e.g. LAN/WAN network backbone systems and/or Internet), using a network such as a local area network, wide area network, internet, intranet, extranet, proprietary network, virtual private network, a TCP/IP-based network, a wireless network, an e-mail based network of e-mail transmitters and receivers, a modem-based telephonic network, or a combination of one or more of the foregoing.

Configuration with Two Hosts and Two Power Supply Systems

Figure 2:
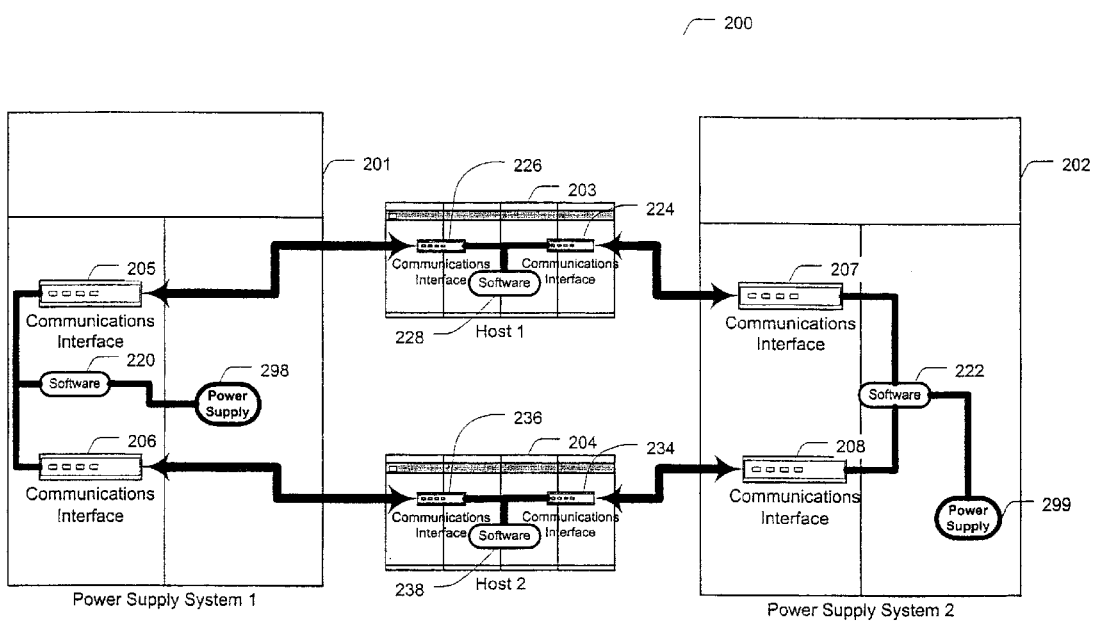
FIG. 2 is a system diagram illustrating another exemplary multiple host power control system, consistent with one embodiment of the invention, comprising two hosts and two power supply systems.

Turning now to FIG. 2, a system diagram illustrates another exemplary multiple host power control system 200, consistent with one embodiment of the invention, comprising two hosts 203, 204 and two power supply systems 201, 202. Host 203 is equipped with one communications interface 226, 224 for each power supply system 201, 202, as well as appropriate software 228 for interfacing with the power supply systems 201, 202. Likewise, host 204 is equipped with one communications interface 236, 234 for each power supply system 201, 202, as well as appropriate software 238 for interfacing with the power supply systems 201, 202. One power supply system 201 comprises a power supply 298, two communications interfaces 205, 206, one for each host 203, 204, and appropriate software 220 for interfacing with the hosts 203, 204. Likewise, the other power supply system 202 comprises a power supply 299, two communications interfaces 207, 208, one for each host 203, 204, and appropriate software 222 for interfacing with the hosts 203, 204. The communications interfaces 205, 206, 207, 208 of each power supply system 201, 202 are physically separate and redundant, and one communications interface 205, 206, 207, 208 is provided on each power supply system 201, 202 for each host 203, 204 in the system. The communication interfaces 205, 206, 207, 208 of the power supply systems 201, 202 are coupled to software algorithms 220, 222 (described in further detail hereinbelow, under Power Supply System Algorithms, with reference to FIGS. 5–8) for determining whether the power supply system 201, 202 should be on or off at a given point in time, based on signals received from the hosts 203, 204, and for turning the respective power supply 298, 299 on or off, accordingly. Those skilled in the art will recognize that, although the software 220, 222 of the power supply systems 201, 202 is illustrated in FIG. 2 as being a single piece of code in communication with the communications interfaces 205, 206, 207, 208, alternatively, the software 220, 222 could reside outside the power supply systems 201, 202, or each communications interface 205, 206, 207, 208 of the power supply systems 201, 202 could contain its own software (not shown) for interfacing with the other communications interface 205, 206,207,208 of that power supply system 201, 202, as well as with the hosts 203, 204. Likewise, appropriate communications interfaces 226, 224, 236, 234 and software 228, 238 reside on each host 203, 204 for interfacing with each of the power supply systems 201, 202. Of course, the software 228, 238 could alternatively reside outside the hosts 203, 204 or could be internal to the communications interfaces 226, 224, 236, 234 of the hosts 203, 204.

Configuration with Three Hosts and One Power Supply System

Figure 3:
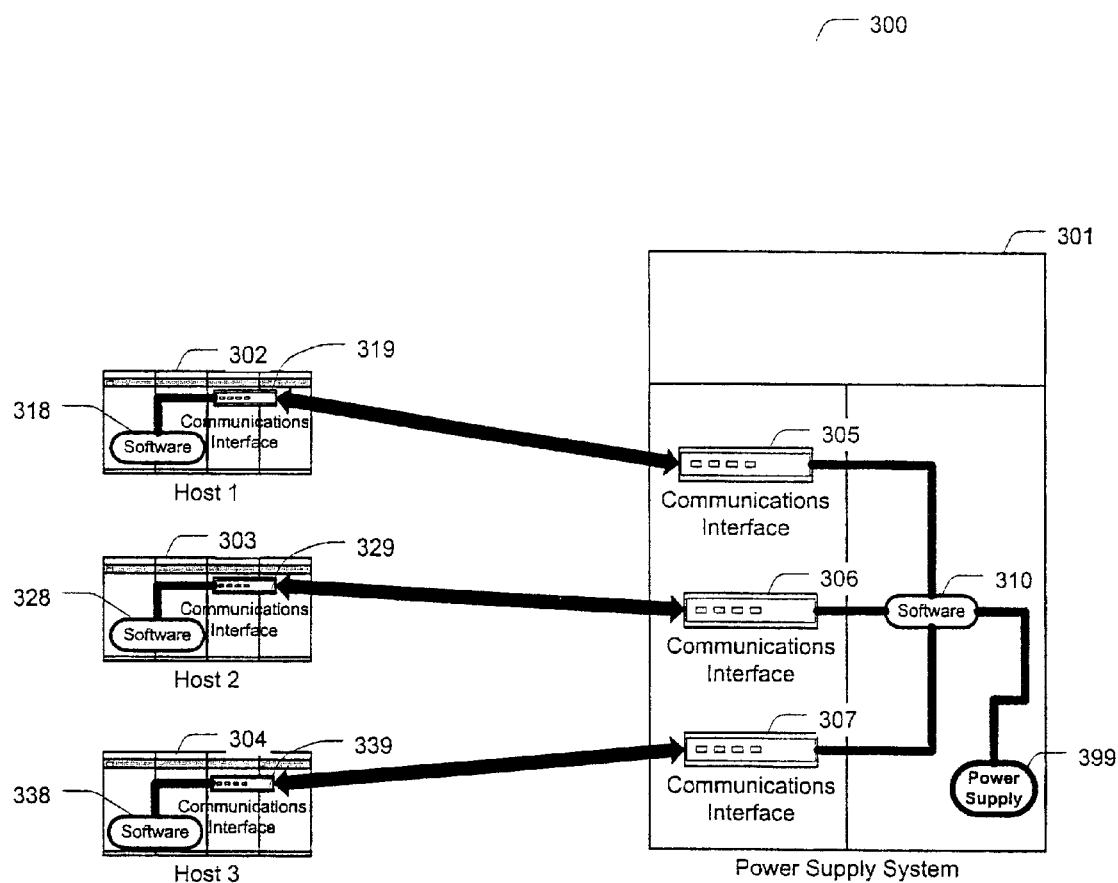
FIG. 3 is a system diagram illustrating still another exemplary multiple host power control system, consistent with one embodiment of the invention, comprising three hosts and one power supply system.

With reference now to FIG. 3, a system diagram illustrates still another exemplary multiple host power control system 300, consistent with one embodiment of the invention, comprising three hosts 302, 303, 304 and one power supply system 301. Each host 302, 303, 304 is equipped with a communications interface 319, 329, 339 and appropriate software 318, 328, 338 for interfacing with the power supply system 301. The power supply system 301 comprises a power supply 399, three communications interfaces 305, 306, 307, one for each host 302, 303, 304 and appropriate software 310 for interfacing with the hosts 302, 303, 304. The communications interfaces 305, 306, 307 are physically separate and redundant, and one communications interface 305, 306, 307 is provided for each host 302, 303, 304 in the system. The communication interfaces 305, 306, 307 of the power supply system 301 are coupled to a software algorithm 310 (described in further detail hereinbelow, under Power Supply System Algorithms, with reference to FIGS. 5–8) for determining whether the power supply system 301 should be on or off at a given point in time, based on signals received from the hosts 302, 303, 304, and for turning the power supply 399 on or off, accordingly. Those skilled in the art will recognize that, although the software 310 of the power supply system 301 is illustrated in FIG. 3 as being a single piece of code in communication with all three communications interfaces 305, 306, 307, alternatively, the software 310 could reside outside the power supply system 301, or each communications interface 305, 306, 307 of the power supply system 301 could contain its own software (not shown) for interfacing with each other and with the hosts 302, 303, 304. Likewise, appropriate communications interfaces 319, 329, 339 and software 318, 328, 338 reside on each host 302, 303, 304 for interfacing with the power supply system 301. Of course, the software 318, 328, 338 could alternatively reside outside the hosts 302, 303, 304 or could be internal to the communications interfaces 319, 329, 339 of the hosts 302, 303, 304.

Configuration with Two Hosts and Four Power Supply Systems

Figure 4:
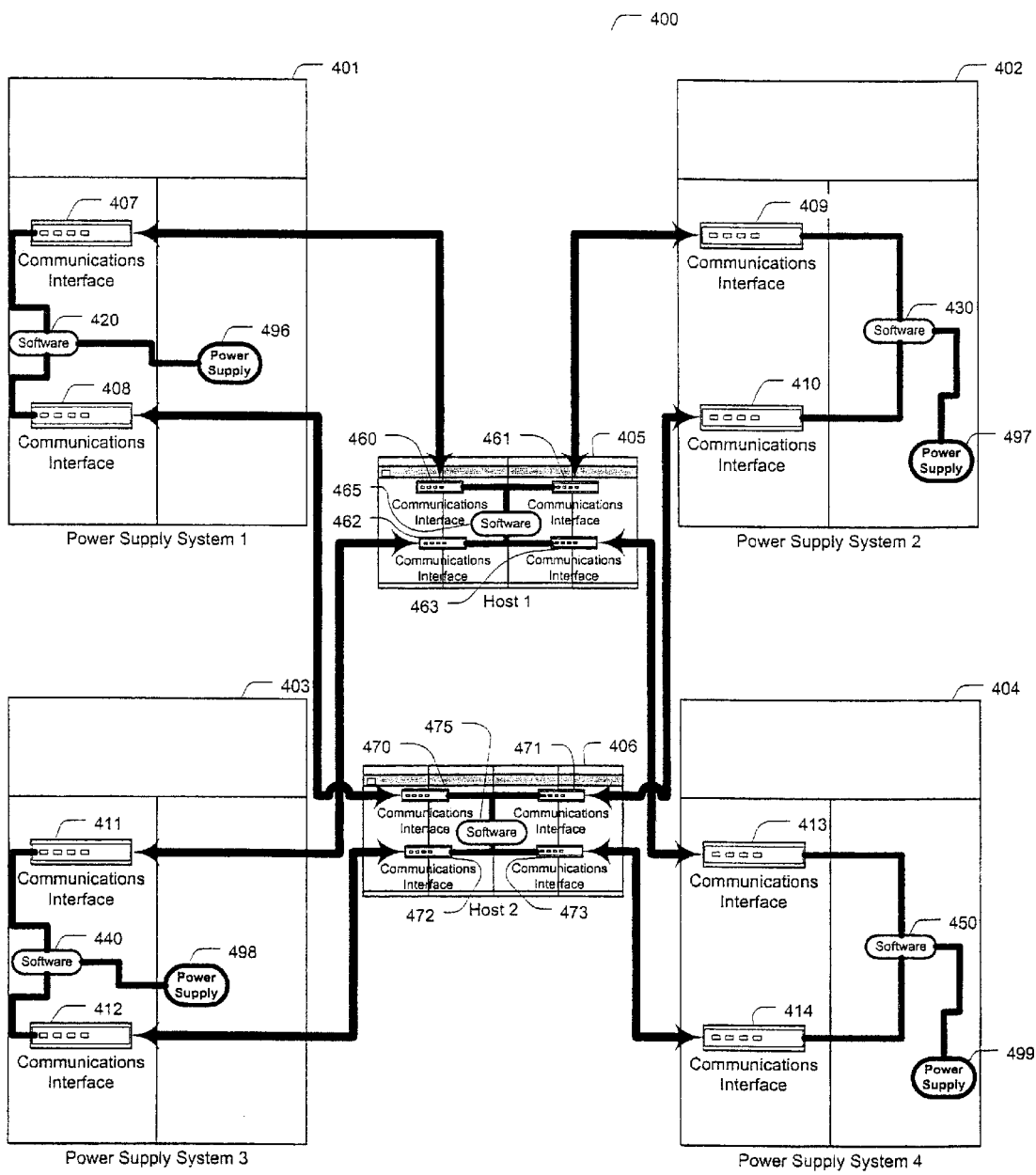
FIG. 4 is a system diagram illustrating a further exemplary multiple host power control system, consistent with one embodiment of the invention, comprising two hosts and four power supply systems.

Turning now to FIG. 4, a system diagram illustrates a further exemplary multiple host power control system 400, consistent with one embodiment of the invention, comprising two hosts 405, 406 and four power supply systems 401, 402, 403, 404. One host 405 is equipped with one communications interface 460, 461, 462, 463 for each power supply system 401, 402, 403, 404, as well as appropriate software 465 for interfacing with the power supply systems 401, 402, 403, 404. Likewise, the other host 406 is equipped with one communications interface 470, 471, 472, 473 for each power supply system 401, 402, 403, 404, as well as appropriate software 475 for interfacing with the power supply systems 401, 402, 403, 404. Each power supply system 401, 402, 403, 404 comprises a power supply 496, 497, 498, 499, two communications interfaces 407–408, 409–410, 411–412, 413–414, one for each host 405, 406, and appropriate software 420, 430, 440, 450 for interfacing with the hosts 405, 406. The communications interfaces 407–408, 409–410, 411–412, 413–414 of each power supply system 401, 402, 403, 404 are physically separate and redundant, and one communications interface 407–408, 409–410, 411–412, 413–414 is provided on each power supply system 401, 402, 403, 404 for each host 405, 406 in the system. The communication interfaces 407–408, 409–410, 411–412, 413–414 of the power supply systems 401, 402, 403, 404 are coupled to software algorithms 420, 430, 440, 450 (described in further detail hereinbelow, under Power Supply System Algorithms, with reference to FIGS. 5–8) for determining whether the power supply system 401, 402, 403, 404 should be on or off at a given point in time, based on signals received from the hosts 405, 406, and for turning the respective power supply 496, 497, 498, 499 on or off, accordingly. Those skilled in the art will recognize that, although the software 420, 430, 440, 450 of the power supply systems 401, 402, 403, 404 is illustrated in FIG. 4 as being a single piece of code in communication with the communications interfaces 407–408, 409–410, 411–412, 413–414, alternatively, the software 420, 430, 440, 450 could reside outside the power supply systems 401, 402, 403, 404, or each communications interface 407–408, 409–410, 411–412, 413–414 of the power supply systems 401, 402, 403, 404 could contain its own software (not shown) for interfacing with the other communications interface 407–408, 409–410, 411–412, 413–414 of that power supply system 401, 402, 403, 404, as well as with the hosts 405, 406. Likewise, appropriate communications interfaces 460–463, 470–473, 475 reside on each host 405, 406 for interfacing with each of the power supply systems 401, 402, 403, 404. Of course, the software 465, 475 could alternatively reside outside the hosts 405, 406 or could be internal to the communications interfaces 460–463, 470–473 of the hosts 405, 406.

Power Supply System Algorithms

An algorithm resides in software on each power supply system in a multiple host power control system consistent with the invention, the algorithm determining whether that power supply should be on or off at a given time.

Figure 5:
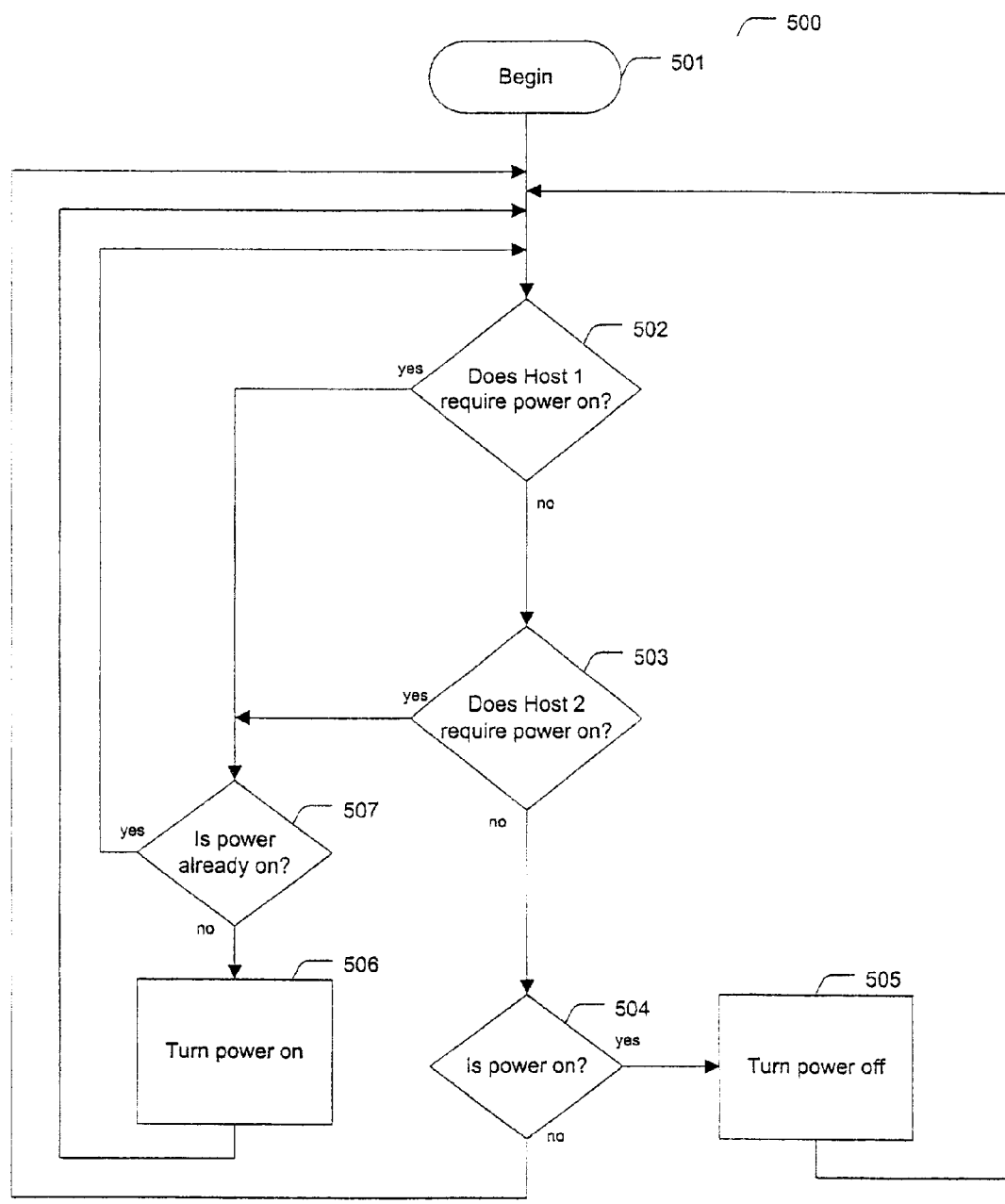
FIG. 5 is a flowchart illustrating an exemplary power supply system algorithm in a multiple host power control system consistent with one embodiment of the invention.

The flowchart 500 of FIG. 5 illustrates one such exemplary algorithm for an exemplary power supply system algorithm in a two-host power control system consistent with one embodiment of the invention. As shown in FIG. 5, the process begins at step 501, and next, at step 502, a determination is made whether the first host requires power on. If not, at step 503, a determination is made whether the second host requires power on. If neither host requires power on, a determination is made, at step 504, whether the power is on. If so, the power is turned off, at step 505, and control loops back to step 502. If the power is not on, control loops from step 504 back to step 502, without switching power at all. If either the first or second host requires power on (which is determined at steps 503 and 504, respectively), a determination is made, at step 507, whether power is already on. If not, at step 506, power is turned on, and control loops back to step 502. If the power is already on, control loops from step 507 back to step 502, without switching power at all. Such an algorithm might be appropriate where no "heartbeat" (i.e., a message sent at regular intervals from the host to the communications interface on the power supply system simply to signal that the host is functioning properly) is used, but rather, where a host requiring power simply transmits a constant signal to indicate when power is required and is otherwise silent. It is noted that, with the use of this algorithm, a host should repetitively transmit the power state it wishes to effect. For example, if a host wishes to turn the power system on then it repetitively and continually issues "turn on commands" to the power system, even when the power system is already on. To turn the power system off, the host would conversely send "turn off commands" repetitively. The "commands" sent to the power system serve as both a directive to take action and as a "heartbeat" indicating that the host is operational. Of course, the foregoing algorithm could be easily modified to implement a host control system having more than two hosts.

Figure 6:
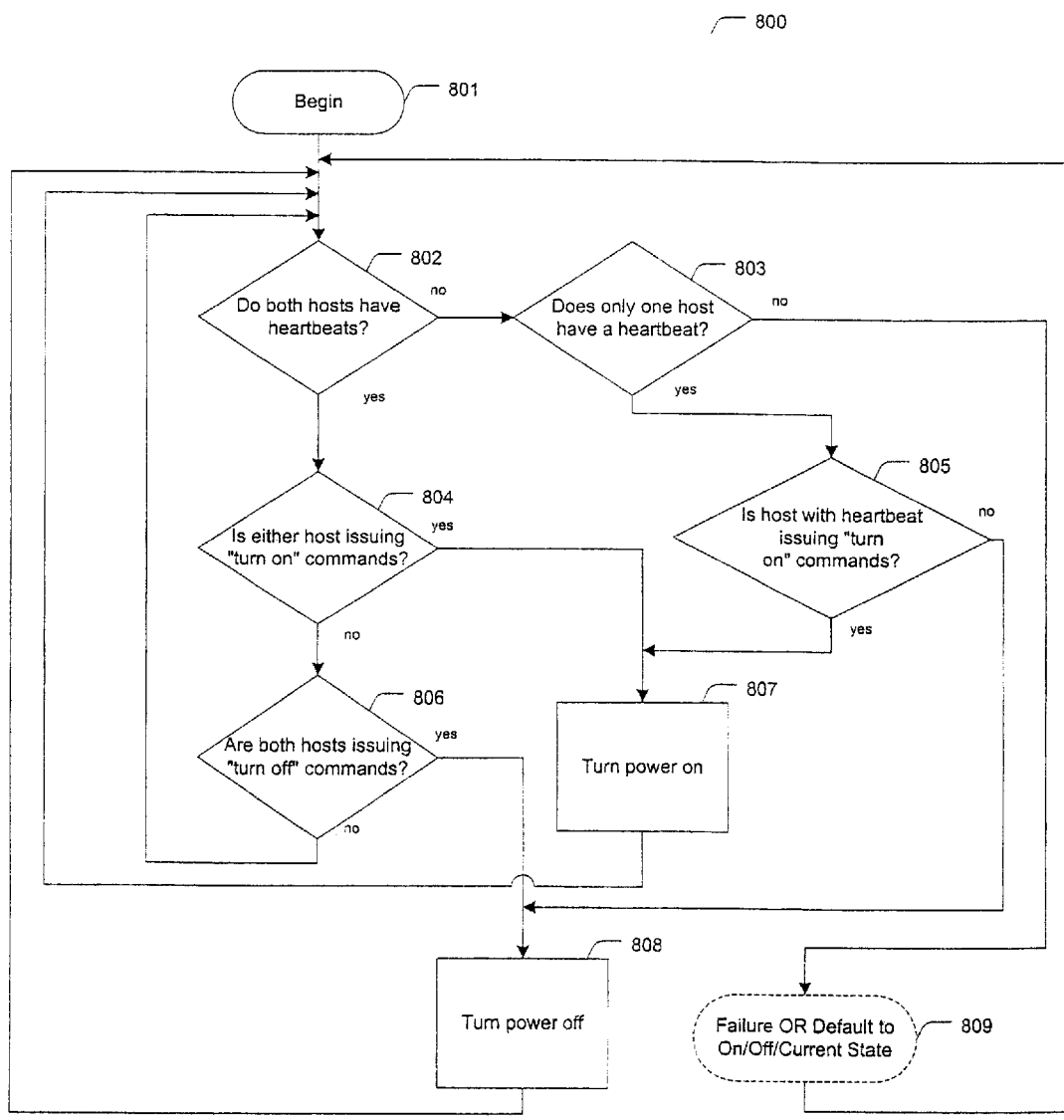
FIG. 6 is a flowchart illustrating another exemplary power supply system algorithm in a multiple host power control system consistent with one embodiment of the invention.

FIG. 6 is a flowchart 800 illustrating another exemplary algorithm for an exemplary power supply system algorithm in a two-host power control system consistent with one embodiment of the invention. In this embodiment, a "heartbeat" signal is issued constantly from each host, to indicate that the host is "alive" and functioning properly. As shown in FIG. 6, the process begins at step 801, and next, at step 802, a determination is made whether both hosts have heartbeats. If so, at step 804, a determination is made whether either host is issuing "turn on" commands. If so, at step 807, the power is turned on, and control loops back to step 802. If neither host is issuing "turn on" commands, as determined at step 804, a determination is made, at step 806, whether both hosts are issuing "turn off" commands. If both hosts are issuing "turn off" commands, the power is turned off, at step 808, and control loops back to step 802. If, at step 806, it is determined that both hosts are not issuing "turn off" commands, control loops back to step 802, without switching power at all. If both hosts do not have heartbeats, as determined at step 802, a determination is made whether only one host has a heartbeat, at step 803. If only one host has a heartbeat, a determination is made, at step 805, whether the host with the heartbeat is issuing "turn on" commands. If the host with the heartbeat is issuing "turn on" commands, the power is turned on, at step 802, and control loops back to step 802. If the host with the heartbeat is not issuing "turn on" commands, as determined at step 805, the power is turned off, at step 808, and control loops back to step 802. If, at step 803, it is determined that neither host has a heartbeat, several different actions might take place, depending on how the system is configured: either control simply loops back to step 802 (and the system does not take any action with respect to turning power on or off), or a failure condition occurs at step 809, wherein a predetermined default to a particular state occurs (i.e., default to on, default to off, or default to current power state). The algorithm may be preconfigured to terminate at step 809, or alternatively, preconfigured so that control loops back to step 802 after step 809 is performed. Of course, the foregoing algorithm could be easily modified to implement a host control system having more than two hosts.

Figure 7:
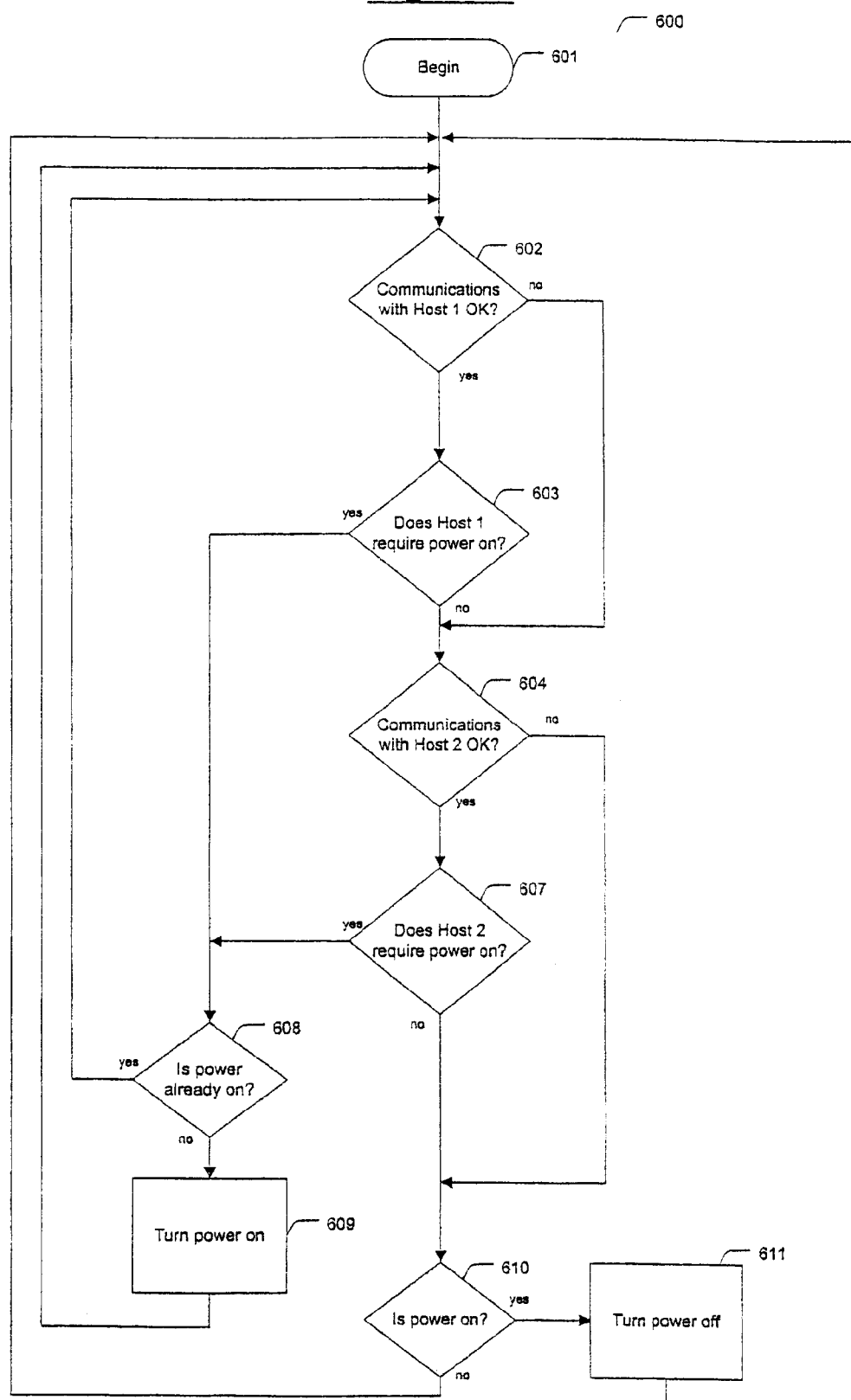
FIG. 7 is a flowchart illustrating still another exemplary power supply system algorithm in a multiple host power control system consistent with one embodiment of the invention.

FIG. 7 is a flowchart 600 illustrating still another exemplary algorithm for an exemplary power supply system algorithm in a two-host power control system consistent with one embodiment of the invention. In this embodiment, either a unidirectional "heartbeat" signal is issued constantly from each host, to indicate that the host is "alive" and functioning properly, or a bi-directional communication verification method (e.g., a signal transmitted in response to a "ping"-type request from the power supply system) is employed. As shown in FIG. 7, the process begins at step 601, and next, at step 602, a determination is made whether communications with the first host are functioning properly (via, e.g., "ping" or "heartbeat"). If so, at step 603, a determination is made whether the first host requires power on. If, at step 602, it is determined that communications with the first host are not functioning properly, step 603 is skipped. If the first host does not require power on, as determined at step 603, or if communications with the first host are not functioning properly, are determined at step 602, a determination is made, at step 604, whether communications with the second host are functioning properly (via, e.g., "ping" or "heartbeat"). If so, at step 607, a determination is made whether the second host requires power on. If neither host requires power on (as determined at steps 603 and 607), or if the first host has a communication failure, and the second host does not require power (as determined at steps 603 and 607), a determination is made, at step 610, whether the power is on. If so, the power is turned off, at step 611, and control loops back to step 602. If the power is not on, control loops from step 610 back to step 602, without switching power at all. If either the first or second host requires power on (which is determined at steps 603 and 607, respectively), a determination is made, at step 608, whether power is already on. If not, at step 609, power is turned on, and control loops back to step 602. If the power is already on, control loops from step 608 back to step 602, without switching power at all. If, at step 604, it is determined that communications with the second host are not functioning properly, step 607 is skipped, and execution of step 610 proceeds (since the first host does not require power, and the second host has a communication failure, turn the power off if it is not already off), for a determination of whether the power is on, so that it can be determined whether the power needs to be turned off (or whether it is already off), at step 611, as described hereinabove. In this configuration, if a host is not communicating properly, it is simply ignored with respect to its power requirements. If a host is communicating properly, then its power on requirements are properly met. Of course, the foregoing algorithm could be easily modified to implement a host control system having more than two hosts.

FIG. 8 is a flowchart 700 illustrating a further exemplary algorithm for an exemplary power supply system algorithm in a two-host power control system consistent with one embodiment of the invention. In this embodiment, either a unidirectional "heartbeat" signal is issued constantly from each host, to indicate that the host is "alive" and functioning properly, or a bi-directional communication verification method (e.g., a signal transmitted in response to a "ping"-type request from the power supply system) is employed. As shown in FIG. 8, the process begins at step 701, and next, at step 702, a determination is made whether communications with the first host are functioning properly (via, e.g., "ping" or "heartbeat"). If so, at step 704, a determination is made whether the first host requires power on. If, at step 702, it is determined that communications with the first host are not functioning properly, a determination is made whether communications with the second host are functioning properly, at step 703. If communications with the second host are functioning properly, the system may be configured to report the communications failure of the first host to the second host, at step 705, and step 704 is skipped. If the first host does not require power on, as determined at step 704, or if communications with the first host are not functioning properly, as determined at step 702, but communications with the second host are functioning properly, as determined at step 703, a determination is made, at step 706, whether communications with the second host are functioning properly (via, e.g., "ping" or "heartbeat"). If so, at step 711, a determination is made whether the second host requires power on. If neither host requires power on (as determined at steps 704 and 711), or if the first host has a communication failure, and the second host does not require power (as determined at steps 702 and 711, a determination is made, at step 712, whether the power is on. If so, the power is turned off, at step 714, and control loops back to step 702. If the power is not on, control loops from step 712 back to step 702, without switching power at all. If either the first or second host requires power on (which is determined at steps 704 and 711, respectively), a determination is made, at step 710, whether power is already on. If not, at step 713, power is turned on, and control loops back to step 702. If the power is already on, control loops from step 710 back to step 702, without switching power at all. If, at step 706, it is determined that communications with the second host are not functioning properly, a determination is made whether communications with the first host are functioning properly, at step 707. If communications with the first host are functioning properly, the system may be configured to report the communications failure of the second host to the first host, at step 708, and then to execute step 712 (since the first host does not require power, and the second host has a communication failure, turn the power off if it is not already off), for a determination of whether the power is on, so that it can be determined whether the power needs to be turned off (or whether it is already off), at step 714, as described hereinabove. However, if it is determined, either at steps 702 and 703, or at steps 706 and 707 that both hosts are not functioning properly, several different actions might take place, depending on how the system is configured: either control simply loops back to step 702 (and the system does not take any action with respect to turning power on or off), or a failure condition occurs at step 709, wherein a predetermined default to a particular state occurs (i.e., default to on, default to off, or default to current power state). The algorithm may be preconfigured to terminate at step 709, or alternatively, preconfigured so that control loops back to step 702 after step 709 is performed. In this configuration, if a host is not communicating properly, its communications failure can be reported to the other host or hosts in the system, while the power requirements of the failed host are being ignored. If a host is communicating properly, then its power on requirements are properly met. Of course, the foregoing algorithm could be easily modified to implement a host control system having more than two hosts.

Those skilled in the art will recognize that the present invention may be implemented in hardware, software, or a combination of hardware and software. It should also be appreciated from the outset that one or more of the functional components may alternatively be constructed out of custom, dedicated electronic hardware and/or software, without departing from the present invention. Thus, the present invention is intended to cover all such alternatives, modifications, and equivalents as may be included within the spirit and broad scope of the invention as defined only by the hereinafter appended claims.

What is claimed is:
1. A power control system comprising:
at least two hosts, each said host comprising a host communications interface; and a power supply system, said power supply system comprising a power supply, control software, and a plurality of power supply system communications interfaces;

wherein each said power supply system communications interface corresponds to, and is in communication with, one said host communications interface on each said host; and wherein said control software is adapted to turn on said power supply when at least one said power supply system communications interface receives a "turn on" signal from the corresponding host communications interface.

2. A power control system comprising:

at least two hosts;

a power supply system comprising a power supply, control software, and a separate power supply system communications interface coupled to each said host;

wherein said control software is adapted to turn on said power supply when at least one said power supply system communications interface receives a "turn on" signal from the corresponding host.

3. A power control system comprising:

at least two hosts, each said host comprising a host communications interface; and at least one power supply system, each said power supply system comprising a power supply, control software, and a plurality of power supply system communications interfaces;

wherein each said power supply system communications interface of each said power supply system corresponds to, and is in communication with, one said host communications interface on each said host; and wherein said control software is adapted to turn on its respective power supply when at least one said power supply system communications interface of said power supply system receives a "turn on" signal from the corresponding host communications interface.

4. A method for controlling power in a power control system, said method comprising:

coupling at least two hosts to a power supply system comprising a power supply, each said host repeatedly transmitting either a "turn on" command or a "turn off" command;

coupling said power supply to each said host, via a separate communications interface for each said host; and turning on said power supply if at least one said "turn on" signal is received from at least one said host.

5. A method for controlling power in a power control system, said method comprising:

coupling at least two hosts to a power supply system comprising a power supply, each said host repeatedly transmitting either a "turn on" command or a "turn off" command;

coupling said power supply to each said host, via a separate communications interface for each said host; and turning off said power supply if no said "turn on" signal is received from any said host.

6. A method for controlling power in a power control system, as claimed in claim 5, said method further comprising:

when neither a "turn off" nor a "turn on" signal is received from a given host, transmitting a signal to at least one of the remaining said hosts, to indicate a failure condition at said given host.

7. A method for controlling power in a power control system, said method comprising:

coupling at least two hosts to a power supply system comprising a power supply, each said host repeatedly transmitting a "heartbeat" signal when said host is functioning correctly;

coupling said power supply to each said host, via a separate communications interface for each said host; and controlling power to said power supply by:

turning on said power supply if said "heartbeat" signal is received from more than one said host and any of said more than one said host is transmitting a "turn on" signal;

turning on said power supply if said "heartbeat" signal is received from only one said host and said host is transmitting a "turn on" signal; and turning off said power supply if every host transmitting said "heartbeat" signal is also transmitting a "turn off" signal.

8. A method for controlling power in a power control system, as claimed in claim 7, said method further comprising:

when no "heartbeat" signal is received from a given host, transmitting a signal to at least one of the remaining said hosts, to indicate a failure condition at said given host.

9. A method for controlling power in a power control system comprising at least two hosts and a power supply, said method comprising:

turning on said power supply if a "turn on" signal is received from more than one said host; and turning off said power supply if either a "turn off" signal, or no signal, is received from every host.

* * * * *